UNITED STATES PATENT OFFICE.

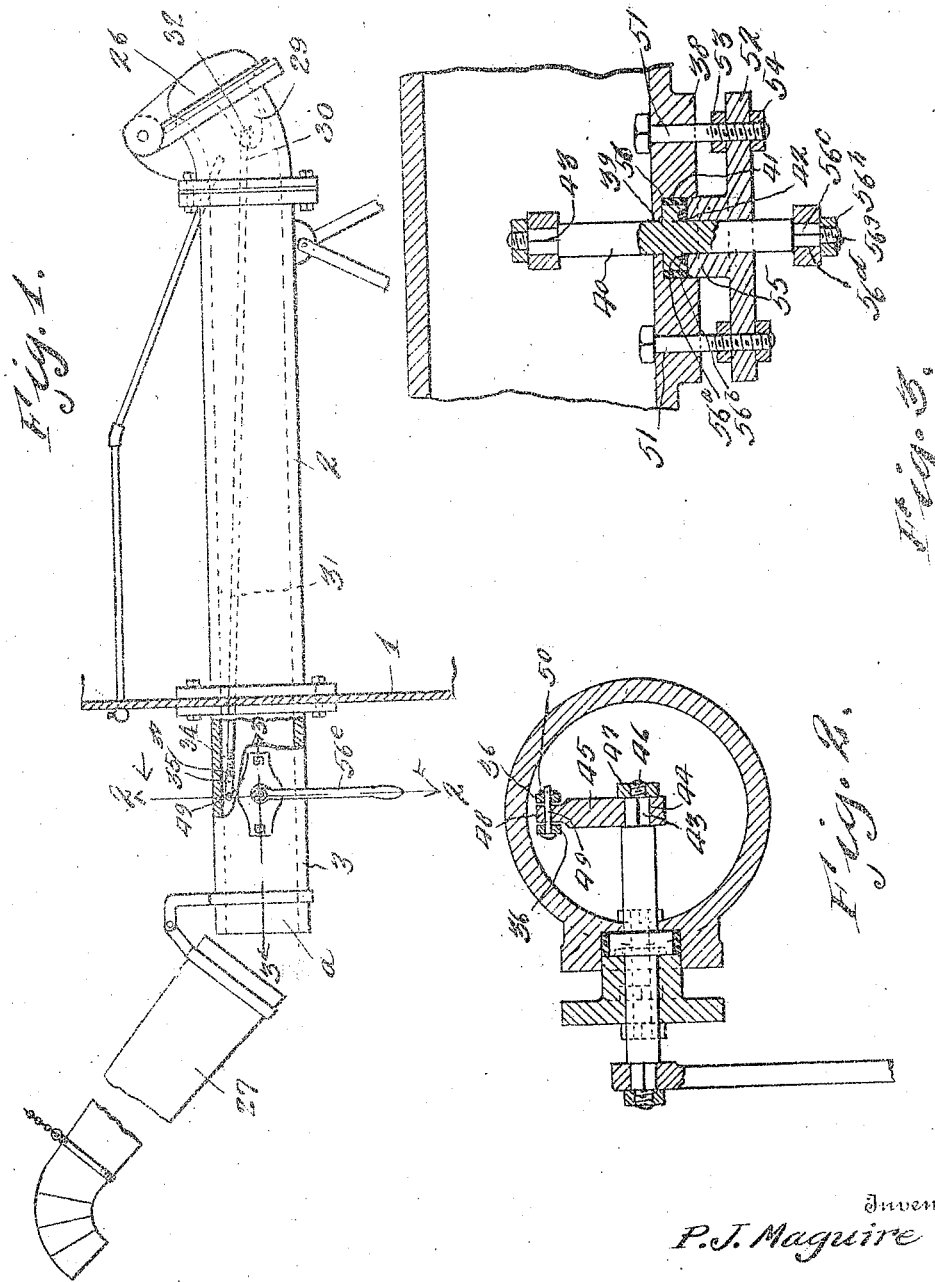

PETER J. MAGUIRE, OF HUTCHINSON, KANSAS.

STUFFING OR PACKING BEARING-BOX.

1,213,928.  Specification of Letters Patent.  Patented Jan. 30, 1917.

Application filed April 19, 1916. Serial No. 92,217.

*To all whom it may concern:*

Be it known that I, PETER J. MAGUIRE, a citizen of the United States, residing at Hutchinson, in the county of Reno, State of Kansas, have invented a new and useful Stuffing or Packing Bearing-Box; and I do hereby declare the following to be a full, clear, and exact description of the invention, such as will enable others skilled in the art to which it appertains to make and use the same.

This invention relates to an improved stuffing or packing bearing box for shafts.

An object of this invention is to provide a device of this kind, more especially adapted for use in connection with rocking crank shafts, particularly those for operating valves of the outlet tubes of railway water tanks, for instance such a valve and tube, as shown in the accompanying drawings.

Another object of the invention is to provide a stuffing or packing bearing box that will avoid leakage of the water as it passes through the outlet tube.

One of the features of the invention is the provision of a bearing opening in the side of the outlet tube having a counter recess adjoining thereto, to receive an integral enlargement or collar of the rock shaft, which extends through the bearing opening of the tube, there being a plate bolted to the wall of the outlet tube and having a boss extending into the counter recess and a bearing opening for the rock shaft, the bolts of said plate may be adjusted, so as to increase or decrease the friction of the boss of the plate upon the integral collar, said boss and the collar acting to prevent leakage. Said boss bears against the integral collar, so as to hold the end of the crank shaft substantially centrally of the outlet tube.

In practical fields the details of construction may necessitate alterations, falling within the scope of what is claimed.

The invention comprises further features and combination of parts, as hereinafter set forth, shown in the drawings and claimed.

In the drawings: Figure 1 is a view in side elevation of an outlet tube of a railway water tank, showing the improved stuffing or packing bearing box applied thereto, for the operating shaft. Fig. 2 is a sectional view on line 2—2 of Fig. 1, showing the construction of the stuffing or bearing box. Fig. 3 is a sectional view on line 3—3 of Fig. 1, at right angles to that shown in Fig. 2.

Referring more especially to the drawings, 1 designates the wall of a railway water tank, and 2 denotes the entire outlet tube for the water. This tube is provided with an outlet valve 26, which may be opened by means of an operating lever, to allow the water to flow from the tank through the tube 2 and into the usual spout 27, which is attached to the end *a* of the tube 2. Extending from the inner face of the valve closure is a lug 29, to which one end 30 of the connecting rod 31 is connected, by the pivot bolt or pin 32. The other end of the connecting rod 31 is provided with threads 34, to engage the interior threads of the turn buckle 35 (which is provided with forks or ears 36) there being a jam nut 37 to be screwed against the turn buckle to prevent displacement of the same. The stub spout section 3 of the outlet tube upon its exterior circumference is provided with a boss 38, and in the center of the boss an opening 39 is provided, through which opening the rock shaft 40 extends. Adjoining the opening 39 is a counter recess 41, and the rock shaft 40 is provided with an integral collar or enlargement 42, which seats in the counter recess 41. The inner end of the rock shaft 40 has a reduced extension 43 rectangular in cross section passing through a corresponding opening 44 in the lower end of the arm 45. The extension 43 has a threaded cylindrical extension 46, to which a nut 47 is threaded, to hold the arm 45 upon the rectangular extension 43. The upper end of the arm 45 has a reduced or flattened extremity 48, which engage between the forks or ears 36 of the turn buckle 35. A pin or bolt 49 extends transversely through the ears 36 and the flattened extremity 48, there being a suitable cotter pin 50, to prevent axial displacement of said bolt 49.

It is to be noted that when the shaft 40 is rocked in one direction or the other, the valve 26 may be opened and closed, through the medium of the arm 45 and the connecting rod 31. Bolts 51 extend through the wall of the section 3 of the outlet tube 2, and have their outer ends threaded, which ends extend through the packing box plate 52, there being nuts 53 and 54 threaded upon the bolts 51, to hold the plate 52 locked in different adjusted positions. The packing or stuffing box plate 52 upon its inner face is provided with a cylindrical boss 55, extending into the counter recess 41, to contact with the integral collar 42 of the rock shaft 40. Suitable packing 56 may be arranged in the counter recess 41, against which the cylindrical surface of the collar 42 engages. Adjacent where the shaft 40 integrally connects to the collar 42, an annular recess $56^a$ is provided, for the reception of the packing $56^b$. This packing $56^b$ and 56 insure prevention of leakage. The outer end of the rock shaft 40 has a reduced extension $56^c$ rectangular in cross section, to engage a correspondingly shaped opening $56^d$ in one end of an operating lever $56^e$, there being a suitable nut $56^h$ threaded upon an extension $56^g$, which extends axially from the extension $56^c$. This nut constitutes means to hold the operating lever $56^e$ in place. It is to be noted that moving the lever $56^e$ in one direction or the other, the shaft 40 may be rocked, which in turn will reciprocate a connecting rod 31, through the medium of the arm 45, to open and close the valve 26.

The invention having been set forth, what is claimed as new and useful is:

A stuffing bearing box for a rock shaft, comprising in combination with a wall having an opening and a counter recess adjoining said opening, a shaft mounted in said opening, a plate having a central opening and provided with a boss adjoining its opening, and mounted upon said shaft, whereby the boss may fit said counter recess, said counter recess having a shoulder, a collar integral to the shaft and fitting between the shoulder and said boss and provided with packing on one face and packing on the cylindrical circumference of said collar, bolts extending through said wall from its inner face and threaded through said plate, and provided with nuts to engage the inner and outer faces of said plate for adjusting the plate.

In testimony whereof I have signed my name to this specification in the presence of two subscribing witnesses.

PETER J. MAGUIRE.

Witnesses:
 EVA BEEM,
 MAE E. ROBERTS.